United States Patent [19]

Jain

[11] 4,355,311

[45] Oct. 19, 1982

[54] MULTIBEAM SINGLE FREQUENCY SYNTHETIC APERTURE RADAR PROCESSOR FOR IMAGING SEPARATE RANGE SWATHS

[76] Inventor: Robert A. Frosch, Administrator of the National Aeronautics and Space Administration, with respect to an invention of Atul Jain, La Canada, Calif.

[21] Appl. No.: 165,910

[22] Filed: Jul. 3, 1980

Related U.S. Application Data

[63] Continuation-in-part of Ser. No. 17,885, Mar. 6, 1979, abandoned.

[51] Int. Cl.³ .................... G01S 13/00; G01S 13/90
[52] U.S. Cl. ........................ 343/5 CM; 343/9 PS; 367/88
[58] Field of Search ............ 343/5 CM, 9 PS; 367/88

[56] References Cited

U.S. PATENT DOCUMENTS

| | | | |
|---|---|---|---|
| 3,184,736 | 5/1965 | Badewitz | 343/5 CM |
| 3,191,170 | 6/1965 | Lustig et al. | 343/5 CM |
| 3,353,177 | 11/1967 | Wilmot | 343/5 VQ |
| 3,548,642 | 12/1970 | Flaherty et al. | 343/5 CM |
| 3,560,973 | 2/1971 | Kazel | 343/5 CM |
| 3,725,915 | 4/1973 | Herman et al. | 343/5 CM |
| 3,727,219 | 4/1973 | Graham | 343/5 CM |
| 3,905,031 | 9/1975 | McCord | 343/5 CM |
| 4,101,891 | 7/1978 | Fletcher et al. | 343/5 CM |
| 4,164,738 | 8/1979 | Swerling | 343/5 CM |
| 4,184,154 | 1/1980 | Albanese et al. | 343/9 R |

OTHER PUBLICATIONS

C. Wu, "A Digital System To Produce Imagery From SAR Data", Proc. of AIAA Systems Design Driven By Sensors Conference, Paper No. 79-768, Oct. 18-20, 1976.

H. Jensen, et al., Scientific American, Oct. 1977, vol. 237, No. 4, pp. 84-95.

*Primary Examiner*—S. C. Buczinski
*Attorney, Agent, or Firm*—Monte F. Mott; John R. Manning; Paul F. McCaul

[57] ABSTRACT

A single-frequency multibeam synthetic aperture radar for large swath imaging is disclosed. Each beam illuminates a separate "footprint" (i.e., range and azimuth interval). The distinct azimuth intervals for the separate beams produce a distinct Doppler frequency spectrum for each beam. After range correlation of raw data, an optical processor develops image data for the different beams by spatially separating the beams to place each beam of different Doppler frequency spectrum in a different location in the frequency plane as well as the imaging plane of the optical processor. Selection of a beam for imaging may be made in the frequency plane by adjusting the position of an aperture, or in the image plane by adjusting the position of a slit. The raw data may also be processed in digital form in an analogous manner.

15 Claims, 5 Drawing Figures

MULTIBEAM SINGLE FREQUENCY SYNTHETIC APERTURE RADAR PROCESSOR FOR IMAGING SEPARATE RANGE SWATHS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; U.S.C. 2457).

CROSS REFERENCE TO RELATED APPLICATION

This application is a continuation-in-part of application Ser. No. 17,885, filed Mar. 6, 1979, now abandoned.

BACKGROUND OF THE INVENTION

This invention relates to synthetic aperture radar (SAR), and more particularly to a method and apparatus for using a single-frequency multibeam antenna for imaging separate range strips of a large swath at high range intervals.

In some applications for SAR, it is desirable to image a swath much greater than is possible for a given interpulse interval. For example, in global oceanography, SAR may be used to monitor ocean states. The ocean wave spectra does not change very rapidly spatially, and so samples of the wave spectra extending over a large area are necessary to enable modeling and prediction of ocean conditions. When the SAR sends out a succession of pulses, the time delay for the pulse return provides the range resolution and Doppler processing of the returns for a series of pulses provides the azimuth resolution for the images.

While the time between successive pulses determines the maximum range that can be mapped by the radar system, too low pulse repetition rate results in azimuth ambiguities due to Doppler foldover of the matched filtered image output. The unambiguous range that can be mapped is given by $cD/8v_a$, where c is the velocity of light, D the antenna dimension and $v_a$ the velocity of the radar platform. This is insuffiunambiguous range for oceanography which requires monitoring ocean conditions over swaths of 10-km widths centered at 100-km intervals up to 1500 km of range. This requires a multibeam system, each beam illuminating a different range swath. The problem is achieving this with a single frequency radar system.

SUMMARY OF THE INVENTION

In accordance with the present invention, a single frequency multibeam synthetic aperture radar system is adapted to illuminate separate range and azimuth intervals for imaging different swaths by a data processing method which separates images in range correlated raw radar data for different beams on the basis of the Doppler frequency spectrum of the beams. The beam parameters are selected so that the return from each successive range swath is received during successive interpulse periods of the radar system, and so that the Doppler spectrum of each beam does not interfere with the Doppler foldover due to the finite pulse repetition frequency of the radar system. The method for processing range correlated data comprises selecting the separate beams at different ranges on the basis of their Doppler frequency spectrum, i.e., by successive narrow band filtering the Doppler frequency spectrum of the beams while recording the image for each successive range swath, or narrow band filtering the image data of all beams simultaneously, and selecting the image data for each successive range swath at the output of the filtering stage. An exemplary technique is to use an optical system to process the range correlated data recorded on film. The optical system consists of a tilted plane correlator having a Fourier transform lens $L_1$, a frequency plane aperture filter F, an inverse Fourier transform lens $L_2$, and a cylindrical azimuth telescope $L_3$. By controlling the size and position of frequency plane aperture, one beam may be selected at a time for recording. Alternatively, by using a large and stationary frequency plane aperture to spatially filter and pass all frequency spectrums, the azimuth telescope may be used to select the image data for each beam by controlling the position of a slit directly in front of a recording film. In either case, the image for each successive range swath may be selected for recording. All of the functions of this optical system may be implemented using digital processing techniques in strictly analogous ways.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 2b illustrates an alternative for the processor of FIG. 2a.

FIG. 3b illustrates the preferred implementation of matched filters (azimuth correlators) in the block diagram of FIG. 3a.

DESCRIPTION OF PREFERRED EMBODIMENTS

Figure 1:
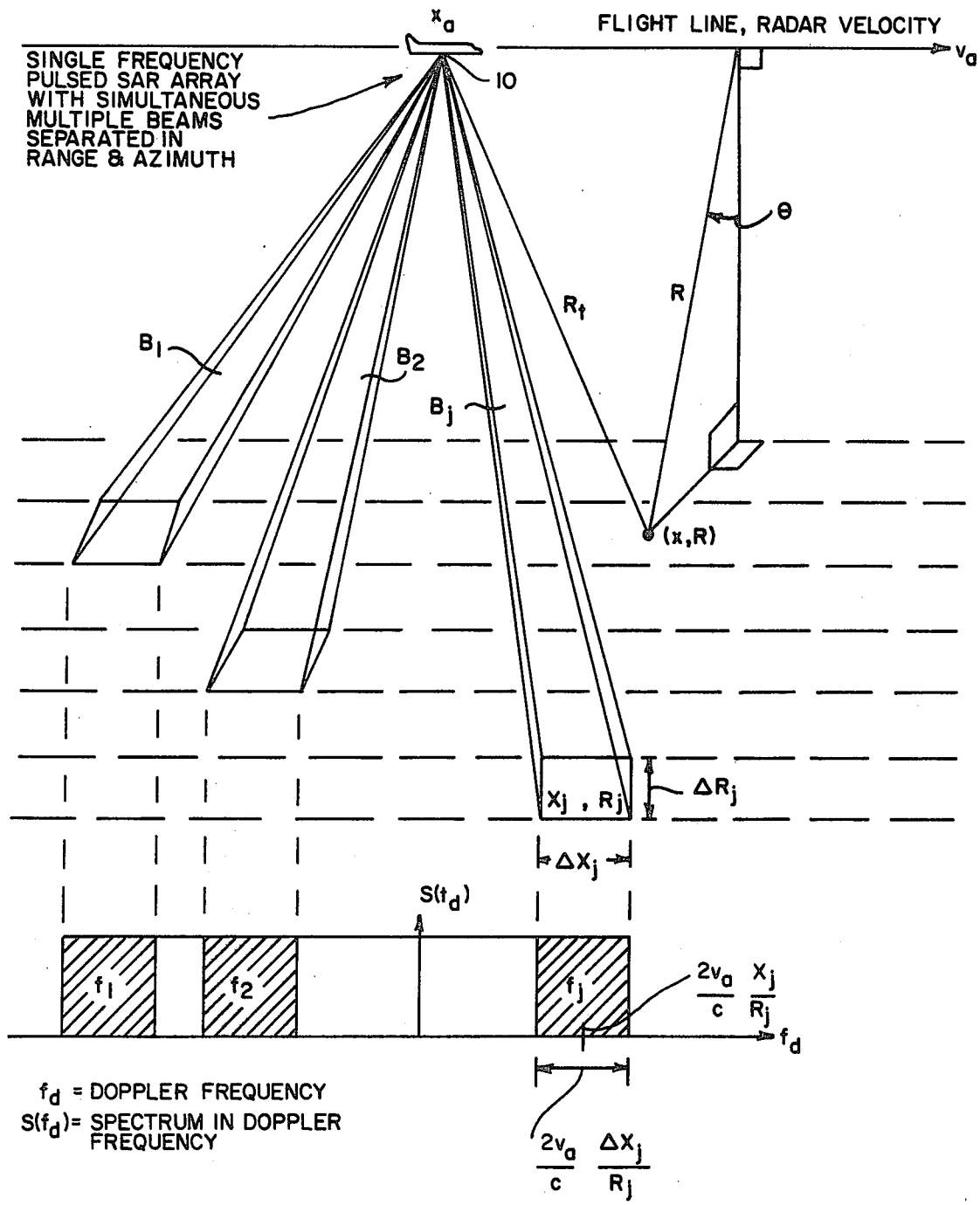
FIG. 1 shows radar image geometry useful in understanding the present invention.

To implement the present invention with single-frequency multibeam side-looking synthetic aperture radar (SAR) 10 shown in FIG. 1, the radar may have a chirped signal with radar frequency ranging from 1200 MHz to 1210 MHz. The return is range correlated and recorded on a data film 12, shown in FIG. 2a, which may then be optically processed to generate map films 14, each film having a different range swath image.

The principle involved is to separate the multiple beam data recorded on the data film 12 into separate Doppler frequency spectrum beams, each beam pointing at a separate range and azimuth interval, as shown in FIG. 1 for beams $B_1$, $B_2$ ... $B_j$. As the radar moves along a flight line at a known velocity, $v_a$, the separate beams sweep distinct range swaths. The range correlated data can be separated into the separate beams on the basis of the Doppler frequency spectra of the returned beam signals, either in the frequency plane of the optical processor, as will be described more fully with reference to FIG. 2a, or in the image plane, as will be described more fully with reference to FIG. 2b. The data recorded on the map films at the image plane is azimuth correlated image data for the separate beams. One beam is recorded on each film.

Although in the example of global oceanography referred to hereinbefore, the range swaths are preferably 10 km wide and centered at 100 km intervals up to 1500 km, FIG. 1 illustrates only three range swaths 10 km wide centered at 10 km for a large swath of 60 km out of which three strips of 10 km each is illuminated by the multiple beam antenna. This is only for simplicity in the illustration. In practice, the large range swath would be separated into multiple strips of 10 km by greater range intervals. As the SAR sends out a succession of chirped pulses, the time delay for the pulse return provides range resolution for the beams, and Doppler frequency processing of the returns for a series of pulses provides azimuth resolution.

While the time between successive pulses determines the maximum range that a synthetic aperture radar can map, too low a pulse rate cannot be relied upon to extend range because it may result in azimuth ambiguities due to Doppler foldover of the matched filtered image output, as pointed out hereinbefore. This multibeam technique allows relatively high pulse repetition rates to be used to avoid that problem, while still extending the range by using different beams at distinct azimuth angles for different range swath strips, as illustrated in FIG. 1. The beam parameters are adjusted so that the return from each successive beam is received during successive interpulse periods of the radar system. The Doppler frequency spectrum for the return from each beam is proportional to the azimuth angle of the beam.

Figure 2A:
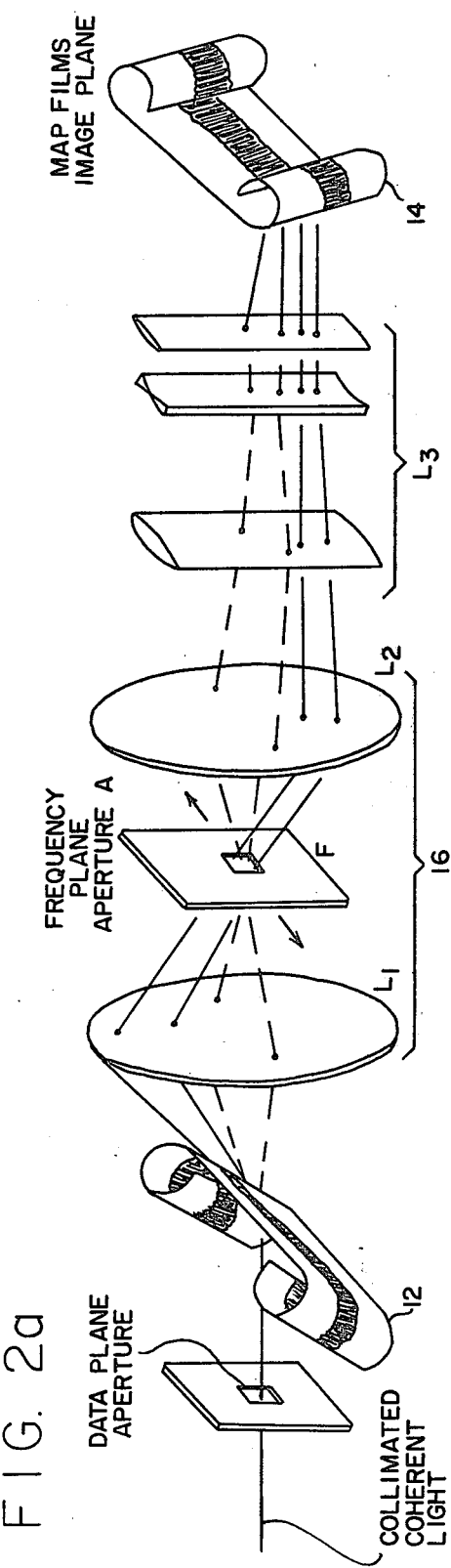
FIG. 2a illustrates the configuration of a tilted plane optical processor which may be used to carry out the present invention.
Figure 2B:
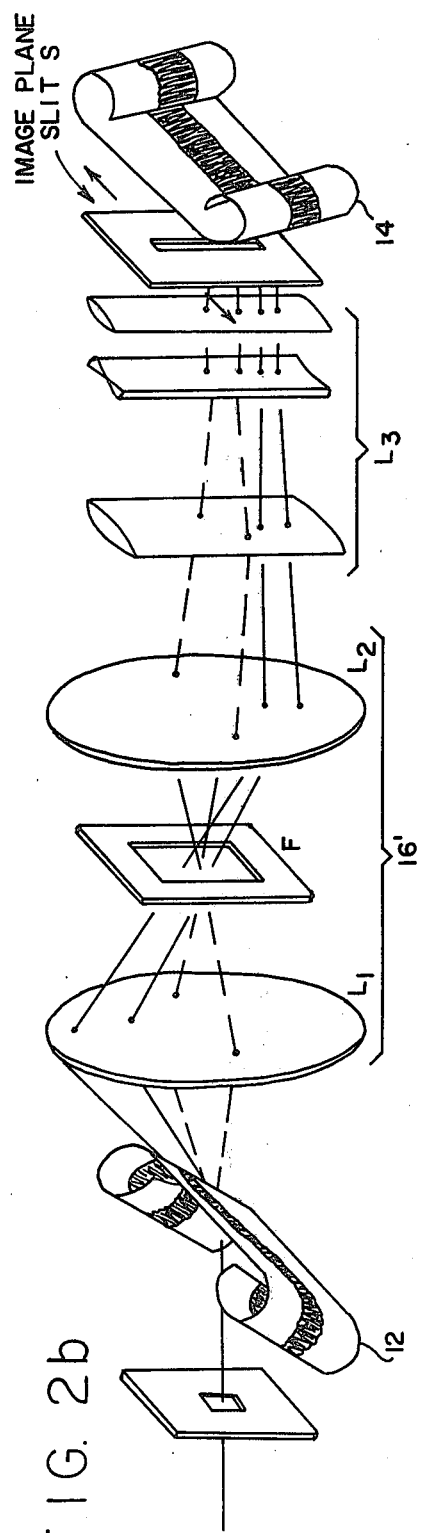

Therefore, in the processing of the signal, the return from each beam may be separated on the basis of its Doppler frequency spectrum at the frequency plane of the optical processor in a range telescope 16 comprised of lens $L_1$ and lens $L_2$ and an appropriate aperture A, as shown in FIG. 2a. Adjusting the position of the aperture along the azimuth axis selects a beam on the basis of its Doppler frequency spectrum. Alternatively, the image formed by each beam can be spatially separated in the azimuth direction by an azimuth telescope $L_3$ and an appropriate slit S in the image plane of the processor as it is used to record the image from individual beams on separate map films, as shown in FIG. 2b.

In the design of the system, the interpulse time is selected to be the time for the radar signal to travel across each range strip. The individual beams are chosen, however, such that the sum of the azimuth angles spanned by all the beams is not greater than the maximum angle permitted for a single beam radar for the same pulse repetition frequency. Thus, in the processing of the radar data, the Doppler frequency spectra returns of the individual beams do not interfere with the Doppler foldover due to the discreteness of the azimuth modulation.

In deriving the properties of the signal and the image formed by this multiple-beam system we follow the approach described in "Focusing Effects in the Synthetic Aperture Radar Imaging of Ocean Waves," *Appl. Phys.*, Vol. 15, pp. 323–333, 1978 by the present inventor. $\rho(x,R,t)$ is the scattering cross section of the surface, x is the azimuth coordinate, R is the range, t is the time coordinate, $v_a$ is the aircraft velocity, $t_a$ is the time the aircraft is at the coordinate $x_a$ (also equal to $v_a t_a$), and $R_t$ is the distance between the radar and some point on the surface at position (x,R). At each successive position of the aircraft, the radar sends out a pulse of the form $E_R \exp[-i(2\pi f_r t - \alpha t^2)] \text{rect}(t/\tau)$ where $E_R$ is the amplitude of the signal, $f_r$ the radar frequency, $\alpha$ the rate of frequency change and $\tau$ the duration of the pulse. The illumination field pattern on the terrain at the time $t_a$, for the multiple beam system, is described by the aperture function $$\sum_j A_j \left( \frac{x - x_j - t_a v_a}{\Delta x_j}, \frac{R - R_j}{\Delta R_j} \right), \tag{1}$$

where $x_j + t_a v_a$ and $R_j$ are the azimuth and range coordinates of the $j^{th}$ beam, $$A_j \left( \frac{x - x_j - t_a v_a}{\Delta x_j}, \frac{R - R_j}{\Delta R_j} \right)$$

is the function describing the pattern of illumination for this beam and $x_j$, $R_j$ are the widths of this function in the azimuth and range dimensions, respectively. The amplitude of the signal detected by the radar receiver is proportional to $$\sum_j \int \int_{-\infty}^{\infty} \sigma_j \rho(x,R,t) A_j \left( \frac{x - x_j - t_a v_a}{\Delta x_j}, \frac{R - R_j}{\Delta R_j} \right) \exp\left[-i(2\pi f_r \left(t - \frac{2}{c} R_t\right) - \alpha \left(t - \frac{2}{c} R_t\right)^2)\right] \text{rect}\left( \frac{t - \frac{2}{c} R_t}{\tau} \right) dR\, dx. \tag{2}$$

$\sigma_j$ is a constant depending upon the antenna gain, amplitude $E_R$ of the radiated pulse, and the range R to the illuminated area. We approximate $R_t$ by $$R + \frac{(x_a - X)^2}{R},$$

neglect the $$\frac{(x_a - x)^2}{2R}$$

quantity in the non-phase terms and neglect $$\frac{(x_a - x)^2}{Rc}$$

in the chirp frequency modulation function as described in *Applied Physics*, supra.

The return from each successive beam is recorded at a separate interpulse time where the time coordinate $t_a$, equal to $x_a/v_a$, describes in the time coordinate frame the aircraft position during which this return is received. The time coordinate covering the duration of this interpulse time is t. During each $(t_a, t)$ coordinate on the signal return, the field detected contains contributions from all pulses radiated at times $$\left(t_a - \frac{2R_j}{c}\right)$$

and the return from each pulse, during an interpulse time, is recorded at $$\left(t + \frac{2R_j}{c}\right).$$

Thus, at any given aircraft position $x_a$, at some time $t_a$, the signal recorded as a function of t is given by $$e_s(t_a,t) = \sum_j \iint_{-\infty}^{\infty} \sigma_j p\left(x,R,t_a - \frac{2R_j}{c}\right) A_j\left(\frac{x - x_j - \left(t_a - \frac{2R_j}{c}\right)v_a}{\Delta x_j}, \frac{R - R_j}{\Delta R_j}\right) \exp\left[i\left(\phi_j + \beta\left(t_a - \frac{2R_j}{c} - \frac{x}{v_a}\right)^2 + \alpha\left(t - \frac{2}{c}(R - R_j)\right)^2\right)\right] \text{rect}\left(\frac{t - \frac{2}{c}(R - R_j)}{\tau}\right) dx\, dR \quad \text{where} \tag{3}$$

The quantities $\phi_j, \beta$ arise from expanding the term $$\exp\left[-i\left\{2\pi f_r\left(t - \frac{2R_t}{c}\right)\right\}\right]$$

where the substitutions $$\left(t + \frac{2R_j}{c}, t_a - \frac{2R_j}{c}\right)$$

have been used for $(t, t_a)^c$ as returns from the $j^{th}$ beam at times $(t, t_a)$. The term $\exp[-i2\pi f_r t]$ has been assumed to have been removed by the demodulation process at the receiver. The returns received as separate interpulse times are recorded adjacent to each other in the signal, $t_a$ being the horizontal coordinate for the film recording and t the vertical coordinate. Since $t_a$ is discrete, the signal recorded by the radar receiver can be described by $$\left\{e_s(t_a, t) \sum_{n=-\infty}^{\infty} \delta(t_a - n\Delta t_p)\right\}$$

where $\Delta t_p$ is the total time duration between adjacent recording times and is generally assumed equal to the total interpulse time for the radar. In the optical matched filtering of the radar signal, the spectrum may be displayed at the frequency plane and the Fourier transform of (1), denoted by $U(f_d, f_\eta)$, for a stationary surface is given by the integral $$\iint_{-\infty}^{\infty} \left\{e_s(t_a,t) \sum_{n=-\infty}^{\infty} \delta(t_a - n\Delta t_p)\right\} \exp[-i2\pi(f_d t_a + f_\eta t)] dt_a dt. \tag{4}$$

In evaluating $U(f_d, f_\eta)$ for a stationary surface, i.e., $\rho(x,R,t)$ is equal to $$\rho(x,R) \cdot A_j\left(\frac{x}{\Delta x_j}, \frac{R}{\Delta R_j}\right)$$

$$\phi_j = \frac{4\pi(R - R_j)}{\lambda_r}, \beta = \frac{2\pi v_a^2}{\lambda_r R}$$

is assumed to be equal to $$\left[\text{rect}\left(\frac{x}{\Delta x_j}\right) \text{rect}\left(\frac{R}{\Delta R_j}\right)\right]$$

where rect (x) is the rectangle function and is equal to unity for x less than half and zero otherwise. The quantities $(\beta, \alpha, \tau, \Delta t_{aj})$, where $\Delta t_{aj}$ is equal to $$\frac{\Delta l_j}{V_a},$$

are assumed large. The transform of the function $$\left[\text{rect}\left(\frac{t}{\delta}\right) \exp[j\pi\alpha^2]\right]$$

is known to be $$\left[\left(\frac{1}{\sqrt{|\alpha|}}\right)\text{rect}\left(\frac{f}{\alpha\delta}\right)\exp\left[j\left\{\frac{\pi f^2}{\alpha} + \frac{\pi}{4}\text{sgn}(\alpha)\right\}\right]\right],$$

this result having been evaluated using the method of stationary phase, and where $\alpha, \delta$ have been assumed large numbers. By using substitution of variables, and this result, the transform of the radar signal is found to be $$U(f_d, f_\eta) = \sum_n \sum_j \iint_{-\infty}^{\infty} \frac{\pi \sigma_j \Delta t_p}{|\alpha\beta|^{\frac{1}{2}}} \rho(x,R) \text{rect}\left(\frac{R - R_j}{\Delta R_j}\right) \text{rect}\left(\frac{\pi f_\eta}{\alpha}\right) \text{rect}\left(\frac{\pi\left(f_d + f_{dj} - \frac{n}{\Delta t_p}\right)}{\beta \Delta t_{aj}}\right) \tag{5}$$

$$\exp\left[-i\pi^2\left\{\frac{\left(f_d + f_{dj} - \frac{n}{\Delta t_p}\right)^2}{\beta} + \frac{f_\eta^2}{\alpha}\right\}\right] \exp\left[i\frac{\pi}{4}\left(\text{sgn}(\beta/\pi) + \text{sgn}\left(\frac{\alpha}{\pi}\right)\right)\right]$$

$$\exp\left[i\left\{\phi_j + \beta\left(\frac{x_j}{v_a}\right)^2 - 2\pi\left[f_d\left(\frac{2R_j}{c} + \frac{(x-x_j)}{v_a}\right) + 2f_\eta\left(\frac{R-R_j}{c}\right)\right]\right\}\right] dx\,dR$$

where $f_{dj} = \frac{\beta x_j}{\pi V_a}$ and sgn denotes the sign function which is positive or negative unity for the argument greater or less than zero, and zero for the argument equal to zero. We note that, for the return from the $j^{th}$ beam of the antenna, the Doppler frequencies have a bandwidth $$\frac{\beta \Delta_j}{\pi v_a}$$

centered at $$\frac{\beta x_j}{\pi V_a}.$$

The return from each beam may therefore be separated at the frequency plane of the optical processor and the unwanted returns blocked off. Provided the processor parameter $\beta$ includes the range $R_j$ of the selected beam, and the interpulse time $t_a$ chosen so that there is no overlap between the Doppler foldover and the Doppler spectrum for the individual beams, the image for each beam may be recorded by successively moving the frequency plane aperture in the Doppler frequency dimension.

In deriving the image of the terrain from the signal, the processing consists of convolving a section of the signal data with the function $\exp -i(\beta t_a^2 + \alpha t^2)$. This yields the image, $e_i(t_{ao}, t_o)$ to be equal to $$\int\int_{-\infty}^{\infty} \{e_s(t_a, t) \text{rect}(t_a/\Delta t_a)$$

$$\sum_{\eta=-\infty}^{\infty} \delta(t_a - n\Delta t_p)\} \exp -i\{\beta(t_{ao} - t_a)^2 + \alpha(t_o - t)^2\} dt_a dt.$$

The function rect $(t_a/\Delta t_a)$, where $\Delta t_a$ is equal to $\Delta t_{aj}$, all $\Delta t_{aj}$ being equal, is included to account for the finite length of the signal being processed at any given instant. This integral may be evaluated by a straightforward substitution of variables and the field at a particular moment in the image plane of the processor is given by $$e_1(t_{ao}, t_o) = \sum_n \sum_j \int\int_{-\infty}^{\infty} \sigma_j(\tau \Delta t'_a \Delta t_p) \rho(x, R) \text{rect}\left(\frac{R - R_j}{\Delta R_j}\right) \text{sinc}\left\{\frac{\Delta t'_a \beta}{\pi}\left(t_{ao} - \frac{2R_j}{c} - \frac{x}{v_a} - \frac{n\pi}{\beta \Delta t_p}\right)\right\} \text{sinc}\left\{\frac{\alpha \tau}{\pi}\left(t - 2\frac{(R-R_j)}{c}\right)\right\} \exp\left[-i\left\{\beta\left(t_{ao} - \frac{x-x_j}{v_a} - \frac{2R_j}{c}\right)^2 - \beta\left(\frac{x_j}{v_a}\right)^2 + \alpha\left(t_o - \frac{2(R-R_j)}{c}\right)^2 + \frac{2n\pi}{\Delta t_p}\left(\frac{2R_j}{c} + \frac{x-x_j}{v_a}\right)\right\}\right] dx\,dR \tag{6}$$

if $\Delta t_a > 0$, and 0 otherwise $$\text{sinc}(x) = \frac{\sin \pi x}{\pi x}, \quad \Delta t'_a = \Delta t_a - 2\left(\frac{2R_j}{c} + \frac{(x-x_j)}{v_a}\right).$$

We note that, while the image from each beam is separated in the azimuth direction corresponding to the azimuth coordinate of the area illuminated, the range coordinates of all the images span the same range interval, independent of the range interval of the area illuminated. Thus, while it is not possible to separate the images for different ranges, it is possible to separate them in the azimuth dimension.

In summary, we have calculated in Equation (3) the signal that would be recorded by a multibeam synthetic aperture radar system, where each beam illuminates a separate range and azimuth footprint such that returns from each of the beams for a given pulse arrives at separate interpulse periods. In Equation (5) we calculate the spectrum of this signal and show that the return for a single beam may be separated using an aperture in the frequency plane of the processor, to only allow transmission of the Doppler frequencies corresponding to the selected beam. In Equation (6) we calculate the image formed at the output of the processor and show that the images from the different beams are separated in the azimuth dimension, but they all image in the same range interval. Thus, images from each beam may be recorded individually by using an aperture movable in the azimuth direction either in the frequency plane or the image plane of the processor, and the separate images combined to provide the large swath desired. In the interpretation of this analysis, however, we have assumed that the azimuth width of each beam is small enough so that the Doppler spectrum of the individual beam does not interfere with the Doppler foldover due to the finite pulse repetition frequency.

From the foregoing, it is evident that the single-frequency multibeam range correlated raw data may be separated into the separate beams by Doppler frequency filtering, where each beam illuminates a separate footprint (i.e., range and azimuth interval). It is therefore appropriate that the images for different beams range correlated and recorded on data film 12 may be separated and recorded on map films 14 on the basis of the Doppler frequency spectrum of the beams using an adjustable frequency plane aperture A, as shown in FIG. 2a, or their spatial azimuth separation in the image plane using an adjustable image plane slit S, as shown in FIG. 2b, when using an optical data processor. In the arrangement of FIG. 2a, the lens $L_1$ and the lens $L_2$ cooperate to perform fast Fourier transform (FFT) correlation in azimuth with selective Doppler frequency spectrum filtering of each beam, so that each beam is selected, one at a time, by positioning the aperture A. In other words, the range telescope 16 spatially separates the Doppler frequency spectra of the beams at the frequency plane. Moving the small aperture A then selects the spatially separated and azimuth correlated beam data for recording through an azimuth telescope $L_3$. In the arrangement of FIG. 2b, a fixed and large aperture is provided at the frequency plane of a range telescope 16 to pass all of the spatially separated and azimuth correlated beam data for recording through an azimuth telescope. To block all but one beam at any time while recording, a narrow slit S is placed in front of the map films. Moving the slit in the azimuth direction then selects the beam to be recorded.

To better appreciate the optical data processing described with reference to FIGS. 2a and 2b, an analogous digital system will now be described with reference to FIG. 3a. Raw SAR data is first processed through a range correlator 20 for correlation detection of the data in range using as a reference a function generated in a conventional manner for SAR systems by a generator 21. This range correlator may be implemented with a fast Fourier transform (FFT) processor followed by a multiplier for multiplication of the Fourier transform by the range reference functions. The product is then processed through an inverse fast Fourier transform processor to obtain an inverse Fourier transform ($FFT^{-1}$).

The range correlated data is next processed through a range-to-azimuth scan converter 22 which stores the sequentially received range data and then retrieves the data in the azimuth direction bin for correlation in azimuth with a reference from an azimuth function generator 23. The correlation is carried out in matched filters $24_1, 24_2 \ldots 24_j$. Each matched filter is implemented with a one-dimensional fast Fourier transform (FFT) 25, a multiplier 26 and an inverse fast Fourier transform ($FFT^{-1}$) 27. Each matched filter receives a unique azimuth reference function for the Doppler frequency spectrum centered on the frequency $f_j$. In that manner, a bank of matched filters (correlators) provides separate correlation of the different beams. The outputs of the matched filters are then processed through squares $28_1, 28_2 \ldots 28_j$ to obtain image signals that are then stored in separate memories $29_1, 29_2 \ldots 29_j$ for selective retrieval, as schematically indicated by a switch 30.

From the foregoing, it will be appreciated that the digital processing of SAR data in the present invention for any one beam is according to the FFT approach described by Dr. Chialin Wu of the Jet Propulsion Laboratory, Pasadena, Calif., in a paper titled "A Digital System to Produce Imagery from SAR Data," Proceedings of the AIAA Systems Design Driven by Sensors Conference, Paper No. 79-768, Oct. 18-20, 1976. A system block diagram of the FFT SAR data processing approach is as shown in that paper for range correlation, range-to-azimuth scan conversion (corner turning), azimuth correlation and squaring. The distinction of the present invention is the provision of a plurality of matched filters, one for each beam of a single-frequency multibeam SAR, where each beam is not only directed with a different angle $\theta$ for a different slant range R, i.e., for a different strip or small swath of a large swath but also pointing at a separate azimuth angle measured from a beam, with some beams forward for a positive Doppler shift and some beams aft for a negative Doppler shift in the SAR frequency $S(f_d)$. The result is a plurality of beams which can be distinguished in range and Doppler frequency spectrum. Azimuth correlation with separate matched filters separates the beams on the basis of the unique Doppler frequency spectrum, i.e., based upon the inherent narrow band filtering of the azimuth correlation carried out in the matched filters.

Figure 3A:
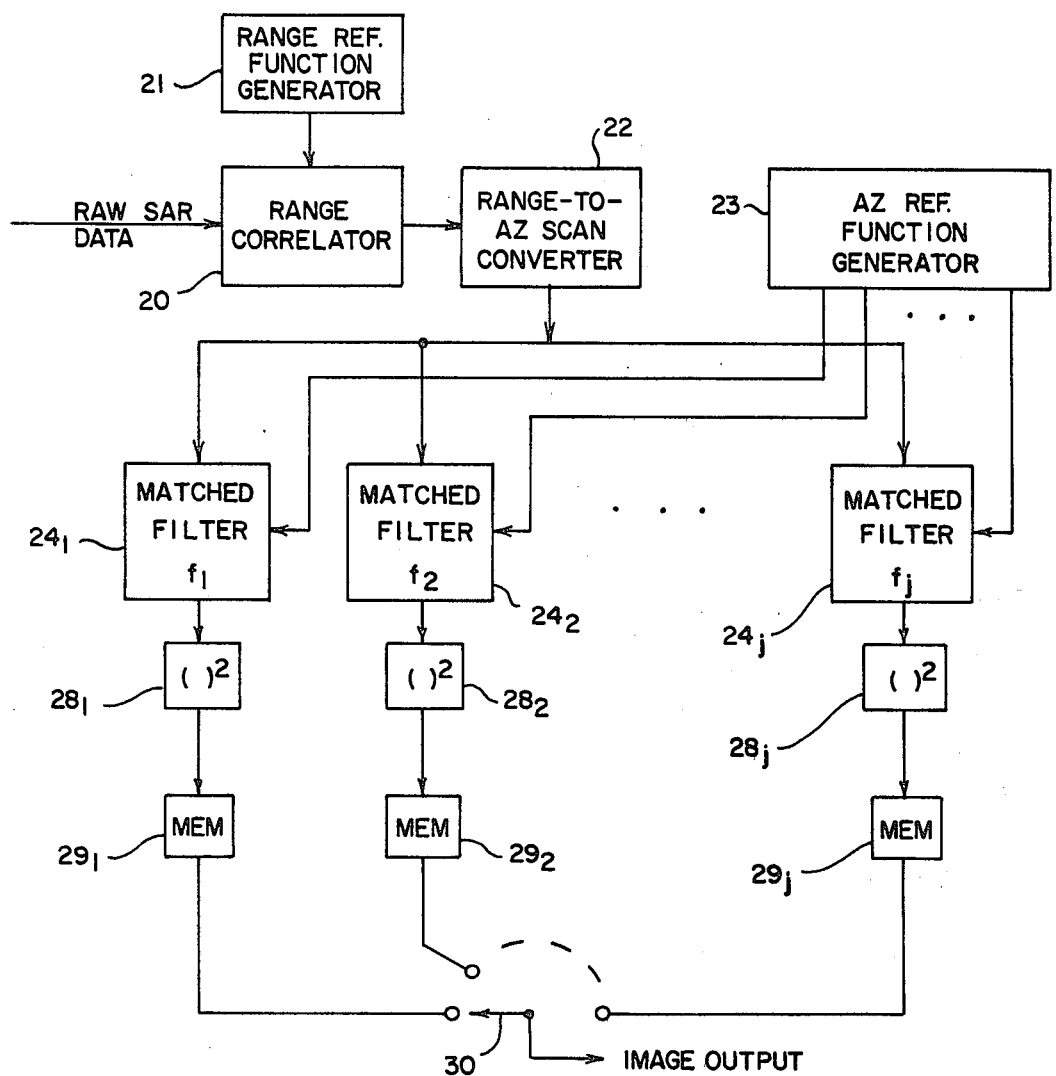
FIG. 3a illustrates the architecture for a digital processor for implementation of the concept of the present invention.
Figure 3B:
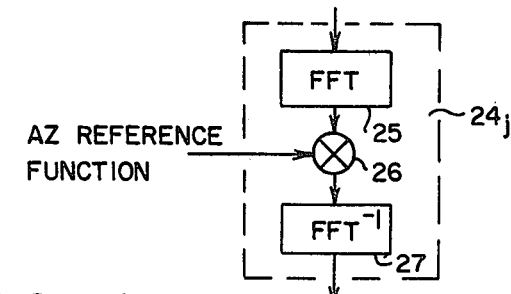

From the above description of FIGS. 3a and 3b, it is evident that the data processing techniques required by the invention are known. What is new is the use of a single-frequency multibeam SAR where each beam illuminates a separate range and azimuth interval, and images for the different beams are separated on the basis of the Doppler spectrum of each beam. It is also evident that the digital processing described is analogous to the optical processing described above, particularly to the digital processing of the optical system shown in FIG. 2a, where the SAR data on the record film 12 has been range correlated. What is required of the optical processor is to scan the data in the azimuth direction (along the length of the film, where range is recorded across the film) and match filtering the data. That is done in a strictly analogous way where the position of the aperture A of optical filter F, in conjunction with the lens $L_2$ and the lens $L_3$ provides the optical equivalent of a reference (transfer) function. The lens $L_1$ provides the equivalent of a fast Fourier transform (FFT) and the lens $L_2$ provides the optical equivalent of the inverse fast Fourier transform ($FFT^{-1}$). An optical system inherently carries the squaring function in the light beam so that squarers are not required. A difference is that this optical system will process only one beam at a time, whereas in the digital system, all beams are processed in parallel. The separate memories $29_1, 29_2 \ldots 29_j$ then permit all beams to be stored simultaneously for selective imaging. In the optical system, separate map films are employed for the different beams, one film for recording each beam.

The optical system of FIG. 2b is not as easily compared to the digital system, but since it is a variant of the system of FIG. 2a, it can also be said to be analogous to the digital system. The difference is that the range telescope utilizes a large aperture to pass all of the Doppler frequency spectrum beams spatially separated by the lens $L_1$. The filtering function necessary to select one beam is then carried out by a slit S in the image plane.

Note that the azimuth direction is horizontal and the range direction is vertical, so by positioning the slit in the horizontal direction with the slit oriented vertically, any one of the spatially separated beams may be selectively recorded. In that mmaner azimuth correlation is carried out by the lens $L_1$, $L_2$ and the slit S.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. In a multibeam synthetic aperture radar system, wherein each beam is directed to a different range and azimuth defined target area, a method for processing return data from pulses periodically transmitted simultaneously in each beam at a single frequency, a method for imaging separate range swaths over a range greater than otherwise possible for the interval between periodic pulses comprising the steps of range correlating the return radar data separated in successive interpulse periods to form image data for a plurality of range swaths, and separating in azimuth the return radar data thus correlated in range by filtering a unique Doppler frequency spectrum for each beam to form a plurality of distinct range and azimuth defined beams for imaging a beam selected at a unique azimuth angle in each range swath defined by an interpulse period, said azimuth angle being an angle on either side of a direction from said radar system normal to said range swaths.

2. A method as defined in claim 1 wherein separation in azimuth of the data of each range swath is performed simultaneously and data for a unique range swath is selected for imaging by selection of azimuth separated data.

3. In a multibeam synthetic aperture radar system wherein each beam is directed with a different range and azimuth as said system is carried along a flight line, a method for imaging multiple swaths of range with a single transmitted frequency comprising the method of separating radar data for each successive range to form range resolved image data, separating images in the range resolved image data by Doppler frequency spectra filtering data from beams at different azimuth angles, each azimuth angle being an angle on either side of a direction from said radar system normal to said flight line, and selecting data at only one azimuth at a time for imaging.

4. In a synthetic aperture radar system wherein each beam is directed with a different range and azimuth as said system is carried along a flight line, a method for single frequency imaging of multiple range swaths at high range intervals yielding one image for each range by selecting range resolved data at one distinct azimuth angle at a time, each azimuth angle being an angle on either side of a direction from said radar system normal to said flight line, the steps of correlating radar data resolved in range, and selecting range correlated data for mapping images at different azimuth angles in the respective range swaths by Doppler frequency spectra separation of the data, one spectrum for each range.

5. A method as defined in claim 4 wherein said range correlated data is separated in azimuth for imaging at each range by Doppler frequency spectra filtering using a matched filter.

6. A method as defined in claim 4 using a tilted plane processor for separating data in azimuth, said processor having a frequency plane and an image plane for compressing the radar data wherein the range resolved image data are Doppler frequency filtered for mapping azimuth selected images using a small aperture positioned in said frequency plane to select a unique narrow Doppler frequency spectrum for each range.

7. A method as defined in claim 4 wherein range resolved data are Doppler frequency filtered by spatial frequency spectra separation and data of one azimuth separated image is selected at a time for each range as a function of spatial position.

8. A method as defined in claim 7 using a tilted plane processor having a frequency plane and an image plane for compressing the radar data wherein the range resolved data are processed through said frequency plane together for spatial separation in azimuth, and spatially separated data are selected for mapping azimuth selected images by positioning a movable slit in the imaging plane.

9. In a multibeam synthetic aperture radar system wherein each beam is directed with a different range and azimuth as said system is carried along a flight line, apparatus for processing return data from periodic pulses at a single frequency, wherein said data are separated in range for each successive pulse period to form range resolved data, comprising means for separating Doppler frequency spectra in the range resolved data for different azimuth angles to form azimuth selected images, one image at each range, and means for selecting azimuth separated image data for mapping selected range swaths.

10. Apparatus as defined in claim 9 wherein said separating means is comprised of a filtering means for selection of a single Doppler frequency spectrum for each beam at a unique azimuth angle.

11. Apparatus as defined in claim 9 wherein said separating means is comprised of a tilted plane optical processor having a frequency plane and an image plane for compressing the radar data, and means in said image plane for selecting a single image in azimuth for mapping.

12. Apparatus as defined in claim 11 wherein said means for selecting a single image in azimuth at said image plane is comprised of a movable aperture.

13. Apparatus as defined in claim 9 wherein said separating means is comprised of means for Doppler frequency spectrum filtering the range resolved data in parallel, and means for selecting Doppler frequency filter spectrum for mapping one image at a range uniquely defined by the selected Doppler frequency filtered spectrum.

14. Apparatus as defined in claim 9 wherein said separating means is comprised of a tilted plane processor having a frequency plane and an image plane for compressing the radar data and means in said frequency plane for spatially separating Doppler frequency spectra for beams at different azimuth angles, and means in said image plane for selecting a spatially separated Doppler frequency spectrum for imaging.

15. Apparatus as defined in claim 14 wherein said processor is a tilted plane processor, and said means for spatially separating Doppler frequency spectra is a large aperture in said frequency plane for passing all images spatially separated, and said means for selecting a spatially separated Doppler frequency spectrum is comprised of a movable slit in the mapping plane.

* * * * *